Inventor
John S. Plenderleath

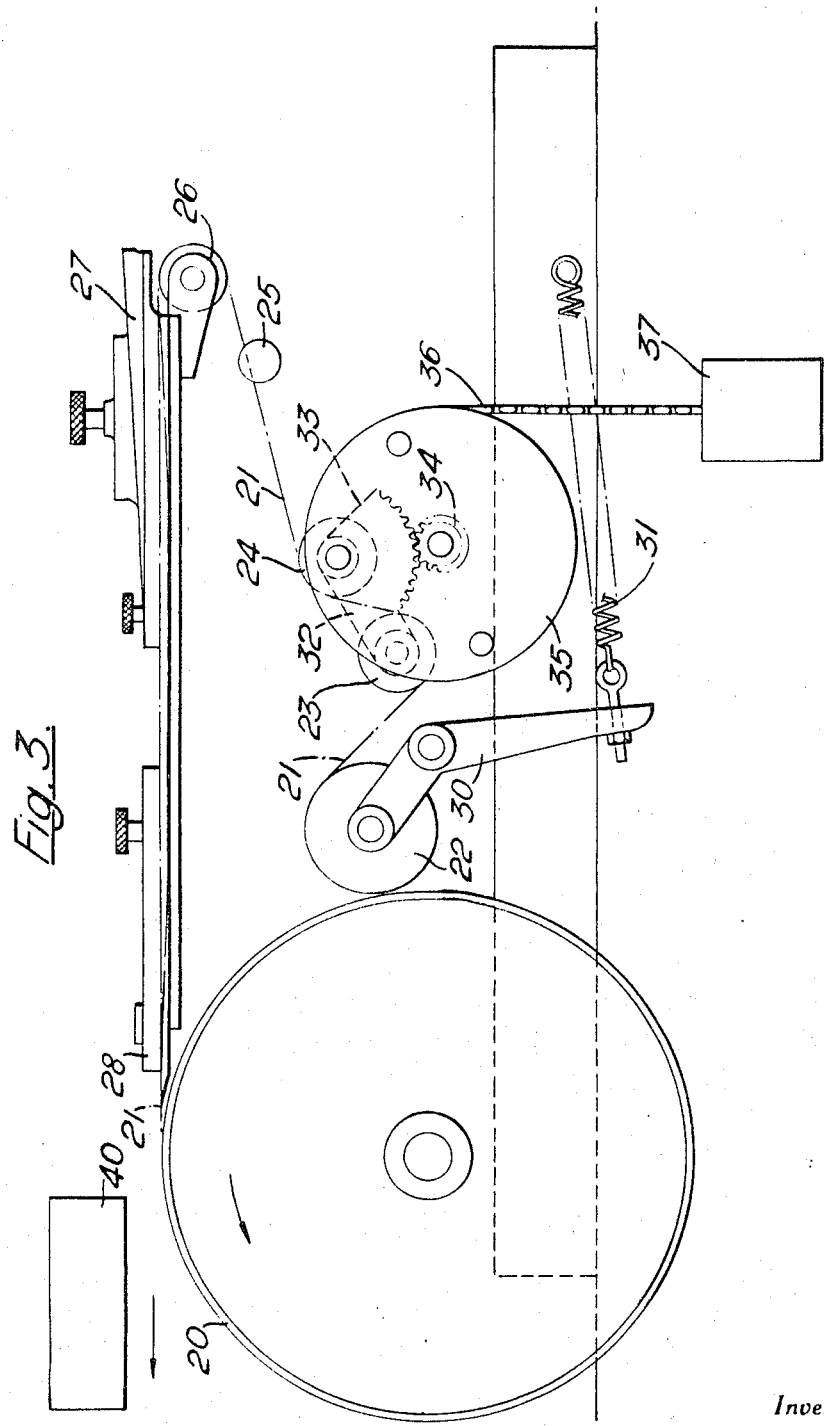

United States Patent Office 3,449,185
Patented June 10, 1969

3,449,185
METHOD OF FUSING A THERMOPLASTIC FILM IN THE GAP OF THE WEFT BETWEEN ALTERNATE WARP THREADS OF A WOVEN FIBROUS BAND
John S. Plenderleath, 4, Home Terrace, Broughty Ferry, Angus, Scotland
Filed Jan. 14, 1966, Ser. No. 520,790
Claims priority, application Great Britain, Jan. 13, 1965, 1,450/65
Int. Cl. D03d 13/00; B32b 3/00
U.S. Cl. 156—148
2 Claims

ABSTRACT OF THE DISCLOSURE

The method of making a band including weaving a band with a continuous warp and with a weft which is complete, except for a gap, inserting a film of suitable thermoplastic material into the gap and fusing the film in position in the gap. Alternate warp threads are woven on either side of the film and weft threads are embedded into the film prior to its being located in the gap.

---

This invention is concerned with improvements in and relating to endless woven fabrics.

Such fabrics have uses, inter alia, as narrow endless conveyor bands in cigarette making machines and previous methods of manufacture have involved hand darning of the gap in the band which remains after weaving has gone as far as is practical. It has been found that the working life of the band is greatly influenced by the accuracy of the darning, that previously known bands are unlikely satisfactorily to meet the increasing speeds of modern machines and that the number of people able and willing to do the hand darning is diminishing.

It is an object of the present invention to obviate or mitigate the aforementioned difficulties.

The present invention is a method of making an endless band including weaving a band with a continuous warp and with a weft which is complete, except for a gap, inserting a film of a suitable thermoplastic material into the gap and fusing this film in position in the gap.

The film may be located in the gap so that alternate warp threads pass on either side of the film.

The film may be fixed in position by means of adhesives or by fusion, preferably by the use of radio-frequency dielectric heating apparatus.

The present invention is also an endless band comprising a continuous warp, a weft which is complete except for a gap and a film of a suitable thermoplastic material fixed in position in the gap.

Embodiments of the present invention will now be described, by way of example, with reference to the accompanying drawings, in which.

FIG. 3 diagrammatically illustrates a cigarette making machine using an endless woven band according to the present invention.

Figure 1:
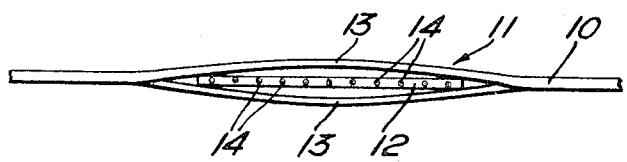
FIG. 1 illustrates one stage in the manufacture of an endless woven band according to the present invention.
Figure 2:
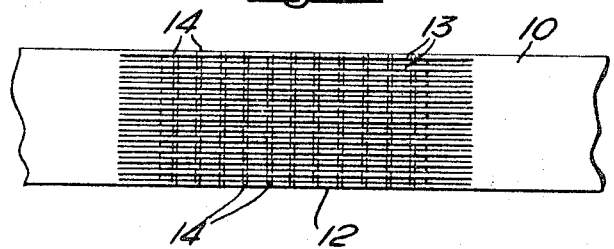
FIG. 2 illustrates part of a completed endless woven band.

Referring now to FIGS. 1 and 2, an endless band 10 is woven with a continuous warp and the weft is woven as far as possible leaving a gap 11 in the weft. A film 12 of suitable thermoplastic material, in this case polyvinyl chloride is located in the gap in the weft with alternate warp threads 13 passing on either side of it. In the embodiment illustrated in FIGS. 1 and 2 the film 12 has embedded in it weft threads 14 prior to it being located in the gap in the warp, which provision reinforces the film against the effects of repeated lateral flexing but may be omitted for less arduous applications. The polyvinyl chloride film is fused in position in the gap by radiofrequency dielectric heating apparatus and the film is then trimmed along the edges of the band.

In FIG. 3 is illustrated a cigarette making machine utilising an endless woven band according to the present invention. A driving wheel 20 rotating in the direction indicated by the arrow engages the band 21 which passes from the driving wheel round a pressing roller 22, a tensioning idler roller 23, an idler roller 24, a guide roller 25, and an idler entry roller 26 through first and second garniture blocks 27 and 28 and thence back to the driving wheel 20. The pressing roller 22 is mounted at one end of a centrally pivoted lever 30 which is biased by a spring 31 at its other end to press the band 21 against the driving wheel 20. The roller 23 is mounted on an arm 32 projecting from a toothed quadrant 33 engaged by a pinion 34 to which is secured a wheel 35 which supports from its periphery, by means of a chain 36, a weight 37. By this means a constant tension is maintained in the band 21. At the entry to the first garniture block 27 a cigarette paper and tobacco are fed onto the flat band, and as the band passed through the block 27 its edges are caused to curve upwards and inwards in tubular formation with its edges almost touching, thus forcing the paper to wrap round the tobacco and form a continuous tobacco filled tube. Adhesive previously applied to the paper acts to seal the tube. As the band passes through the second garniture block 28 it is unrolled and passed off flat to the driving wheel, whereas the cigarette tube passes on to further processes, including heating by a unit 40, with which we are not concerned.

Bearing in mind the high speed of modern cigarette making machines, it can be seen that the band 21 is subjected to severe and sudden flexure about both axes and moreover is heated by the unit 40.

Endless woven fabrics according to the present invention also find application in types of driving or conveyor belts.

What I claim is:
1. A method of making a band including weaving a band with a continuous warp and with a weft which is complete except for a gap, inserting a film of suitable thermoplastic material into the gap, the thermoplastic material being polyvinyl chloride, and fusing the film in the gap so that alternate warp threads pass on either side of the film.

2. A method of making a band as claimed in claim 1, the film having weft threads embedded in it prior to its being fused in the gap.

References Cited

UNITED STATES PATENTS

| 3,035,951 | 5/1962 | Braun et al. | 100—93 |
| 2,672,169 | 3/1954 | Walters | 74—231 XR |
| 3,212,627 | 10/1965 | Beebee | 161—144 XR |
| 3,147,170 | 9/1964 | Frenkel et al. | 156—380 |

PHILIP DIER, Primary Examiner.

U.S. Cl. X.R.

28—73; 156—298, 306; 161—38, 145

UNITED STATES PATENT OFFICE
CERTIFICATE OF CORRECTION

Patent No. 3,449,185                                June 10, 1969

John S. Plenderleath

It is certified that error appears in the above identified patent and that said Letters Patent are hereby corrected as shown below:

In the heading to the printed specification, lines 5 and 6, "John S. Plenderleath, 4, Home Terrace, Broughty Ferry, Angus, Scotland" should read -- John S. Plenderleath, Angus, Scotland, assignor to Jute Industries Limited, Dundee, Scotland, a British Company --.

Signed and sealed this 15th day of December 1970.

(SEAL)
Attest:

Edward M. Fletcher, Jr.                         WILLIAM E. SCHUYLER, JR.
Attesting Officer                                    Commissioner of Patents